US009455898B2

United States Patent
Johnsen et al.

(10) Patent No.: US 9,455,898 B2
(45) Date of Patent: Sep. 27, 2016

(54) SYSTEM AND METHOD FOR FACILITATING PROTECTION AGAINST RUN-AWAY SUBNET MANAGER INSTANCES IN A MIDDLEWARE MACHINE ENVIRONMENT

(75) Inventors: Bjorn-Dag Johnsen, Oslo (NO); Line Holen, Fetsund (NO); Dag Georg Moxnes, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1184 days.

(21) Appl. No.: 13/235,144

(22) Filed: Sep. 16, 2011

(65) Prior Publication Data

US 2012/0079580 A1  Mar. 29, 2012

Related U.S. Application Data

(60) Provisional application No. 61/384,228, filed on Sep. 17, 2010, provisional application No. 61/484,390, filed on May 10, 2011, provisional application No. 61/493,330, filed on Jun. 3, 2011, provisional application No. 61/493,347, filed on Jun. 3, 2011, provisional application No. 61/498,329, filed on Jun. 17, 2011.

(51) Int. Cl.
*G06F 15/16* (2006.01)
*H04L 12/701* (2013.01)
(Continued)

(52) U.S. Cl.
CPC ............. *H04L 45/00* (2013.01); *H04L 12/462* (2013.01); *H04L 41/0659* (2013.01); *H04L 69/40* (2013.01)

(58) Field of Classification Search
None
See application file for complete search history.

(56) References Cited

U.S. PATENT DOCUMENTS

| 5,805,805 A | 9/1998 | Civanlar et al. |
| 5,964,837 A | 10/1999 | Chao et al. |

(Continued)

FOREIGN PATENT DOCUMENTS

| CN | 1567827 | 1/2005 |
| CN | 1728664 | 2/2006 |

(Continued)

OTHER PUBLICATIONS

Shanley, Tom, Infiniband Network Architecture (excerpt), Pearson Education, published 2002, p. 209-211, 393-394, 551, 554.

(Continued)

*Primary Examiner* — Thomas Dailey
(74) *Attorney, Agent, or Firm* — Tucker Ellis LLP

(57) ABSTRACT

A system and method can support a middleware machine environment that includes a set of subnet manager instances, which reside on one or more nodes in the middleware machine environment and cooperate to provide a highly available subnet manager service within a subnet, wherein each said subnet manager instance is associated with a different private secure key. The subnet manager instances can negotiate with each other and elect a master subnet manager responsible for configuring and managing the middleware machine environment using the private secure key associated with the master subnet manager. The subnet can be reconfigured to be associated with a different private secure key, when a new subnet manager instance is elected as the master subnet manager. An old master subnet manager can be automatically prevented from resuming normal operations as the master subnet manager, in order to avoid undesired consequence such as a "split brain" scenario.

18 Claims, 11 Drawing Sheets

(51) Int. Cl.
*H04L 12/46* (2006.01)
*H04L 12/24* (2006.01)
*H04L 29/14* (2006.01)

(56) References Cited

U.S. PATENT DOCUMENTS

| | | | |
|---|---|---|---|
| 6,463,470 B1 | 10/2002 | Mohaban et al. | |
| 6,594,759 B1 | 7/2003 | Wang | |
| 6,647,419 B1 | 11/2003 | Mogul | |
| 6,678,835 B1 | 1/2004 | Shah et al. | |
| 6,748,429 B1 | 6/2004 | Talluri et al. | |
| 6,829,685 B2 | 12/2004 | Neal et al. | |
| 6,904,545 B1 | 6/2005 | Erimli et al. | |
| 6,941,350 B1 | 9/2005 | Frazier et al. | |
| 6,963,932 B2 | 11/2005 | Bhat | |
| 6,978,300 B1 | 12/2005 | Beukema et al. | |
| 6,981,025 B1* | 12/2005 | Frazier | H04L 69/26 709/209 |
| 6,985,956 B2 | 1/2006 | Luke et al. | |
| 7,023,811 B2 | 4/2006 | Pinto | |
| 7,069,468 B1 | 6/2006 | Olson et al. | |
| 7,113,995 B1* | 9/2006 | Beukema et al. | 709/229 |
| 7,185,025 B2 | 2/2007 | Rosenstock et al. | |
| 7,194,540 B2 | 3/2007 | Aggarwal et al. | |
| 7,200,704 B2 | 4/2007 | Njoku et al. | |
| 7,216,163 B2 | 5/2007 | Sinn | |
| 7,221,676 B2* | 5/2007 | Green | H04L 12/4641 370/392 |
| 7,231,518 B1 | 6/2007 | Bakke | |
| 7,290,277 B1 | 10/2007 | Chou et al. | |
| 7,302,484 B1 | 11/2007 | Stapp et al. | |
| 7,356,841 B2 | 4/2008 | Wilson et al. | |
| 7,398,394 B1 | 7/2008 | Johnsen et al. | |
| 7,409,432 B1 | 8/2008 | Recio | |
| 7,437,447 B2 | 10/2008 | Brey et al. | |
| 7,493,409 B2 | 2/2009 | Craddock et al. | |
| 7,500,236 B2 | 3/2009 | Janzen | |
| 7,633,955 B1 | 12/2009 | Saraiya et al. | |
| 7,634,608 B2 | 12/2009 | Droux et al. | |
| 7,685,385 B1 | 3/2010 | Choudhary et al. | |
| 7,724,748 B2 | 5/2010 | Davis | |
| 7,783,788 B1 | 8/2010 | Quinn et al. | |
| 7,843,822 B1 | 11/2010 | Paul et al. | |
| 7,860,961 B1 | 12/2010 | Finkelstein et al. | |
| 7,873,711 B2 | 1/2011 | Adams et al. | |
| 8,184,555 B1 | 5/2012 | Mouton et al. | |
| 8,291,148 B1 | 10/2012 | Shah et al. | |
| 8,327,437 B2 | 12/2012 | McAlister | |
| 8,331,381 B2 | 12/2012 | Brown et al. | |
| 8,335,915 B2 | 12/2012 | Plotkin et al. | |
| 8,423,780 B2 | 4/2013 | Plotkin et al. | |
| 8,549,281 B2 | 10/2013 | Samovskiy et al. | |
| 8,583,921 B1 | 11/2013 | Shu | |
| 2002/0059597 A1 | 5/2002 | Kikinis et al. | |
| 2002/0120720 A1 | 8/2002 | Moir | |
| 2002/0188711 A1 | 12/2002 | Meyer et al. | |
| 2003/0009487 A1 | 1/2003 | Prabakaran et al. | |
| 2003/0009551 A1 | 1/2003 | Benfield et al. | |
| 2003/0079040 A1 | 4/2003 | Jain et al. | |
| 2003/0093509 A1 | 5/2003 | Li et al. | |
| 2003/0105903 A1 | 6/2003 | Garnett et al. | |
| 2003/0120852 A1 | 6/2003 | McConnell et al. | |
| 2003/0208572 A1 | 11/2003 | Shah et al. | |
| 2004/0022245 A1* | 2/2004 | Forbes et al. | 370/392 |
| 2004/0153849 A1 | 8/2004 | Tucker et al. | |
| 2004/0199764 A1 | 10/2004 | Koechling et al. | |
| 2004/0220947 A1 | 11/2004 | Aman et al. | |
| 2004/0249928 A1 | 12/2004 | Jacobs et al. | |
| 2005/0044363 A1 | 2/2005 | Zimmer et al. | |
| 2005/0071382 A1 | 3/2005 | Rosenstock | |
| 2005/0071709 A1 | 3/2005 | Rosenstock | |
| 2005/0091396 A1 | 4/2005 | Nilakantan et al. | |
| 2005/0105554 A1 | 5/2005 | Kagan et al. | |
| 2005/0125520 A1 | 6/2005 | Hanson et al. | |
| 2005/0182831 A1 | 8/2005 | Uchida et al. | |
| 2005/0182853 A1 | 8/2005 | Lewites et al. | |
| 2005/0198164 A1 | 9/2005 | Moore et al. | |
| 2005/0198250 A1 | 9/2005 | Wang | |
| 2005/0213608 A1 | 9/2005 | Modi et al. | |
| 2005/0273641 A1 | 12/2005 | Sandven et al. | |
| 2006/0079278 A1 | 4/2006 | Ferguson et al. | |
| 2006/0195560 A1 | 8/2006 | Newport | |
| 2006/0221975 A1 | 10/2006 | Lo et al. | |
| 2006/0233168 A1 | 10/2006 | Lewites et al. | |
| 2007/0110245 A1 | 5/2007 | Sood et al. | |
| 2007/0129917 A1 | 6/2007 | Blevins | |
| 2007/0195794 A1 | 8/2007 | Fujita et al. | |
| 2007/0206735 A1 | 9/2007 | Silver et al. | |
| 2007/0253328 A1 | 11/2007 | Harper et al. | |
| 2008/0031266 A1 | 2/2008 | Tallet et al. | |
| 2008/0144614 A1 | 6/2008 | Fisher et al. | |
| 2008/0159277 A1 | 7/2008 | Vobbilisetty et al. | |
| 2008/0183853 A1 | 7/2008 | Manion et al. | |
| 2008/0192750 A1 | 8/2008 | Ko et al. | |
| 2008/0201486 A1 | 8/2008 | Hsu et al. | |
| 2008/0209018 A1 | 8/2008 | Hernandez et al. | |
| 2008/0229096 A1 | 9/2008 | Alroy et al. | |
| 2008/0250125 A1 | 10/2008 | Brey et al. | |
| 2008/0310421 A1 | 12/2008 | Teisberg | |
| 2008/0310422 A1 | 12/2008 | Booth et al. | |
| 2009/0049164 A1 | 2/2009 | Mizuno | |
| 2009/0116404 A1 | 5/2009 | Mahop et al. | |
| 2009/0216853 A1 | 8/2009 | Burrow et al. | |
| 2009/0307499 A1 | 12/2009 | Senda | |
| 2009/0327462 A1 | 12/2009 | Adams et al. | |
| 2010/0014526 A1 | 1/2010 | Chavan | |
| 2010/0020806 A1 | 1/2010 | Vahdat | |
| 2010/0080117 A1 | 4/2010 | Coronado et al. | |
| 2010/0082853 A1 | 4/2010 | Block et al. | |
| 2010/0138532 A1 | 6/2010 | Glaeser | |
| 2010/0142544 A1 | 6/2010 | Chapel et al. | |
| 2010/0166167 A1 | 7/2010 | Karimi-Cherkandi et al. | |
| 2010/0235488 A1 | 9/2010 | Sharma et al. | |
| 2010/0268857 A1 | 10/2010 | Bauman et al. | |
| 2010/0306772 A1 | 12/2010 | Arnold et al. | |
| 2011/0072206 A1 | 3/2011 | Ross et al. | |
| 2011/0110366 A1 | 5/2011 | Moore et al. | |
| 2011/0138185 A1 | 6/2011 | Ju et al. | |
| 2011/0173302 A1 | 7/2011 | Rider | |
| 2011/0209202 A1 | 8/2011 | Otranen | |
| 2011/0222492 A1 | 9/2011 | Borsella et al. | |
| 2011/0264577 A1 | 10/2011 | Winbom et al. | |
| 2012/0005480 A1 | 1/2012 | Batke et al. | |
| 2012/0039331 A1 | 2/2012 | Astigarraga et al. | |
| 2012/0195417 A1 | 8/2012 | Hua et al. | |
| 2012/0239928 A1 | 9/2012 | Judell | |
| 2012/0290698 A1 | 11/2012 | Alroy et al. | |
| 2013/0041969 A1 | 2/2013 | Falco et al. | |
| 2013/0138836 A1 | 5/2013 | Cohen et al. | |
| 2013/0159865 A1 | 6/2013 | Smith et al. | |
| 2014/0095876 A1 | 4/2014 | Smith et al. | |

FOREIGN PATENT DOCUMENTS

| | | |
|---|---|---|
| EP | 2 051 436 A1 | 4/2009 |
| JP | 2002247089 | 8/2002 |
| JP | 2002247089 A | 8/2002 |
| JP | 2004166263 | 6/2004 |
| JP | 2005522774 | 7/2005 |
| JP | 2006157285 | 6/2006 |
| JP | 2007501563 | 1/2007 |
| JP | 2008054214 A | 3/2008 |
| JP | 2009510953 | 3/2009 |
| WO | 01/90838 A2 | 11/2001 |
| WO | 2006016698 | 2/2006 |
| WO | 2008099479 | 8/2008 |

OTHER PUBLICATIONS

InfiniBand[SM] Trade Association, InfiniBand™ Architecture Specification, vol. 1, Release 1.2.1, Nov. 2007, pp. 1-1727.

Lee, M., Security Enhancement in Infiniband Architecture, IEEE, vol. 19, Apr. 2005, pp. 1-18.

(56) References Cited

OTHER PUBLICATIONS

Shanley, Tom, "Infiniband Network Architecture" (excerpt), Pearson Education, Copyright © 2002 by MindShare, Inc., published Oct. 2002, p. 204-209, 560-564.

Shanley, Tom, "Infiniband Network Architecture", Pearson Education, Copyright © 2002 by MindShare, Inc., published Oct. 2002 p. 387-394.

European Patent Office, International Searching Authority, International Search Report and Written Opinion dated Sep. 12, 2012 for International Application No. PCT/US2012/040775, 13 pages.

Aurelio Bermudez, On the InfiniBand Subnet Discovery Process, IEEE The Computer Society 2003, pp. 1-6.

Tom Shanley, Infiniband Network Architecture, Pearson Education 2002, p. 559, 561.

Tom Shanley, Infiniband Network Architecture (excerpt), chapter—Detailed Description of the Link Layer, Pearson Education, published 2002, p. 390-392, 485, 491-493, 537-539.

State Intellectual Property Office of the People's Republic of China dated May 5, 2015 for Chinese Patent Application No. 201180039850.7, 2 pages.

Tom Shanley, "Infiniband Network Architecture", Copyright © 2002 by MindShare, Inc., ISBN: 0-321-11765-4, pp. 206-208, 403-406.

V. Kashyap, "IP over InfiniBand (IpoIB) Architecture", Network Working Group RFC 4392, Apr. 2006, 22 pages, retrieved on Apr. 9, 2015 from: <http://www.ietf.org/rfc/rfc4392>.

Tom Shanley, "Infiniband Network Architecture", Copyright © 2002 by MindShare, Inc., ISBN: 0-321-11765-4, pp. 83-87, 95-102, 205-208, 403-406.

State Intellectual Property Office of the People's Republic of China, Search Report for Chinese Patent Application No. 201180039807.0, Jun. 3, 2015, 2 pages.

State Intellectual Property Office of the People's Republic of China, Search Report dated May 29, 2015 for Chinese Patent Application No. 201180040064.9, 1 page.

State Intellectual Property Office of the People's Republic of China, Search Report dated Sep. 9, 2015 for Chinese Patent Application No. 201280027279.1, 2 page.

Tom Shanley, Infiniband Network Architecture (excerpt), Pearson Education, Published 2002, p. 213.

United States Patent and Trademark Office, Office Action Dated Jun. 3, 2016 for U.S. Appl. No. 13/235,187, 22 Pages.

\* cited by examiner

SYSTEM AND METHOD FOR FACILITATING PROTECTION AGAINST RUN-AWAY SUBNET MANAGER INSTANCES IN A MIDDLEWARE MACHINE ENVIRONMENT

CLAIM OF PRIORITY

This application claims the benefit of priority on U.S. Provisional Patent Application No. 61/384,228, entitled "SYSTEM FOR USE WITH A MIDDLEWARE MACHINE PLATFORM" filed Sep. 17, 2010; U.S. Provisional Patent Application No. 61/484,390, entitled "SYSTEM FOR USE WITH A MIDDLEWARE MACHINE PLATFORM" filed May 10, 2011; U.S. Provisional Patent Application No. 61/493,330, entitled "STATEFUL SUBNET MANAGER FAILOVER IN A MIDDLEWARE MACHINE ENVIRONMENT" filed Jun. 3, 2011; U.S. Provisional Patent Application No. 61/493,347, entitled "PERFORMING PARTIAL SUBNET INITIALIZATION IN A MIDDLEWARE MACHINE ENVIRONMENT" filed Jun. 3, 2011; U.S. Provisional Patent Application No. 61/498,329, entitled "SYSTEM AND METHOD FOR SUPPORTING A MIDDLEWARE MACHINE ENVIRONMENT" filed Jun. 17, 2011, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a middleware machine environment.

BACKGROUND

Infiniband (IB) Architecture is a communications and management infrastructure that supports both I/O and inter-processor communications for one or more computer systems. An IB Architecture system can scale from a small server with a few processors and a few I/O devices to a massively parallel installation with hundreds of processors and thousands of I/O devices.

The IB Architecture defines a switched communications fabric allowing many devices to concurrently communicate with high bandwidth and low latency in a protected, remotely managed environment. An end node can communicate with over multiple IB Architecture ports and can utilize multiple paths through the IB Architecture fabric. A multiplicity of IB Architecture ports and paths through the network are provided for both fault tolerance and increased data transfer bandwidth.

These are the generally areas that embodiments of the invention are intended to address.

SUMMARY

Described herein is a system and method for supporting a middleware machine environment. The middleware machine environment can include a set of subnet manager instances that reside on one or more nodes in the middleware machine environment and cooperate to provide a highly available subnet manager service within a subnet, wherein each said subnet manager instance is associated with a different private secure key. The set of subnet manager instances can negotiate with each other and elect a master subnet manager, which is responsible for configuring and managing the middleware machine environment using the private secure key that is associated with the master subnet manager. The subnet is reconfigured to be associated with a different private secure key, when a new subnet manager instance is elected as the master subnet manager. An old master subnet manager can be automatically prevented from resuming normal operations as the master subnet manager, in order to avoid undesired consequence such as a "split brain" scenario.

DETAILED DESCRIPTION

Described herein is a system and method for providing a middleware machine or similar platform. In accordance with an embodiment of the invention, the system comprises a combination of high performance hardware (e.g. 64-bit processor technology, high performance large memory, and redundant InfiniBand and Ethernet networking) together with an application server or middleware environment, such as WebLogic Suite, to provide a complete Java EE application server complex which includes a massively parallel in-memory grid, that can be provisioned quickly, and that can scale on demand. In accordance with an embodiment of the invention, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment of the invention, the system can include a plurality of compute nodes, one or more IB switch gateways, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

Figure 1:
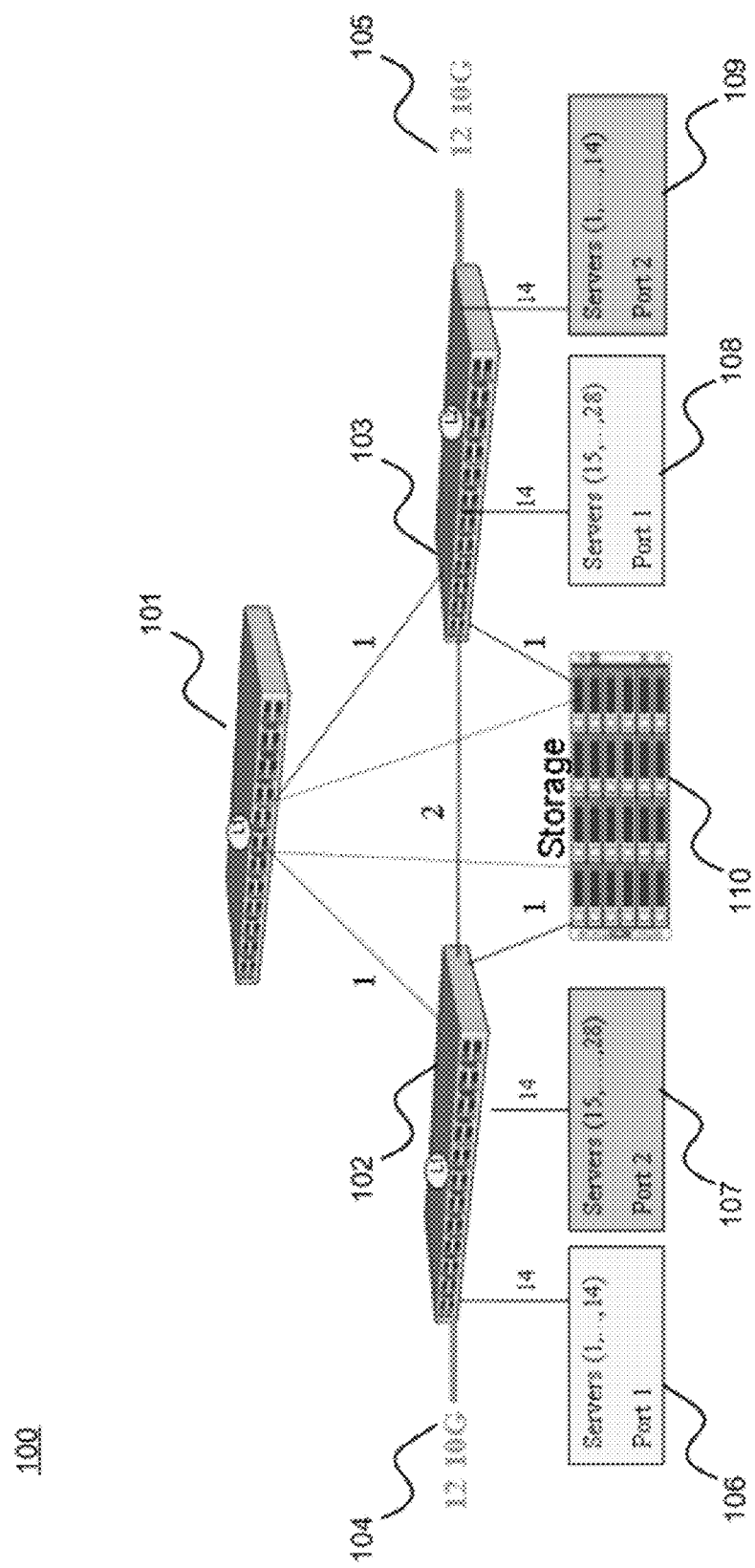
FIG. 1 shows an illustration of a middleware machine environment that uses an M_Key, in accordance with an embodiment of the invention.

FIG. 1 shows an illustration of an exemplary configuration for a middleware machine, in accordance with an embodiment of the invention. As shown in FIG. 1, the middleware machine 100 uses a single rack configuration that includes two gateway network switches, or leaf network switches, 102 and 103 that connect to twenty-eight server nodes. Additionally, there can be different configurations for the middleware machine. For example, there can be a half rack configuration that contains a portion of the server nodes, and there can also be a multi-rack configuration that contains a large number of servers.

As shown in FIG. 1, the server nodes can connect to the ports provided by the gateway network switches. As shown in FIG. 1, each server machine can have connections to the two gateway network switches 102 and 103 separately. For example, the gateway network switch 102 connects to the port 1 of the servers 1-14 106 and the port 2 of the servers 15-28 107, and the gateway network switch 103 connects to the port 2 of the servers 1-14 108 and the port 1 of the servers 15-28 109.

In accordance with an embodiment of the invention, each gateway network switch can have multiple internal ports that are used to connect with different servers, and the gateway network switch can also have external ports that are used to connect with an external network, such as an existing data center service network.

In accordance with an embodiment of the invention, the middleware machine can include a separate storage system 110 that connects to the servers through the gateway network switches. Additionally, the middleware machine can include a spine network switch 101 that connects to the two gateway network switches 102 and 103. As shown in FIG. 1, there can be optionally two links from the storage system to the spine network switch.

IB Fabric/Subnet

In accordance with an embodiment of the invention, an IB Fabric/Subnet in a middleware machine environment can contain a large number of physical hosts or servers, switch instances and gateway instances that are interconnected in a fat-tree topology.

Figure 2:
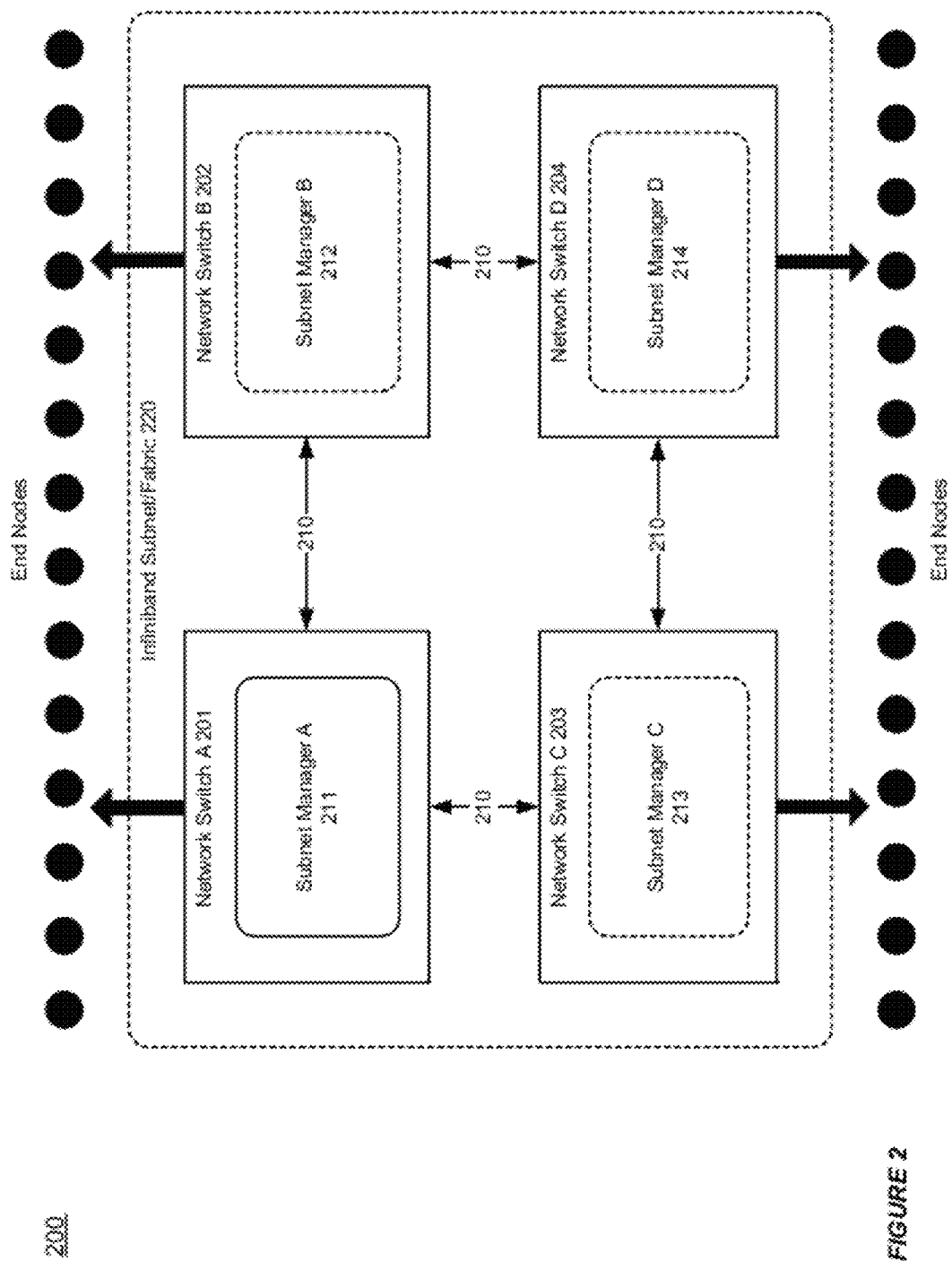
FIG. 2 shows an illustration of a middleware machine environment that employs an explicit take-over scheme, in accordance with an embodiment of the invention.

FIG. 2 shows an illustration of a middleware machine environment, in accordance with an embodiment of the invention. As shown in FIG. 2, the middleware machine environment 200 includes an IB subnet or fabric 220 that connects with a plurality of end nodes. The IB subnet includes a plurality of subnet managers 211-214, each of which resides on a node such as one of a plurality of network switches 201-204. The subnet managers can communicate with each other using an in-band communication protocol 210, such as the Management Datagram (MAD)/Subnet Management Packet (SMP) based protocols or other protocol such as the Internet Protocol over IB (IPoIB).

In accordance with an embodiment of the invention, a single IP subnet can be constructed on the IB fabric allowing the switches to communicate securely among each other in the same IB fabric (i.e. full connectivity among all switches). The fabric based IP subnet can provide connectivity between any pair of switches when at least one route with operational links exists between the two switches. Recovery from link failures can be achieved if an alternative route exists by re-routing.

The management Ethernet interfaces of the switches can be connected to a single network providing IP level connectivity between all the switches. Each switch can be identified by two main IP addresses: one for the external management Ethernet and one for the fabric based IP subnet. Each switch can monitor connectivity to all other switches using both IP addresses, and can use either operational address for communication. Additionally, each switch can have a point-to-point IP link to each directly connected switch on the fabric. Hence, there can be at least one additional IP address.

IP routing setups allow a network switch to route traffic to another switch via an intermediate switch using a combination of the fabric IP subnet, the external management Ethernet network, and one or more fabric level point-to-point IP links between pairs of switches. IP routing allows external management access to a network switch to be routed via an external Ethernet port on the network switch, as well as through a dedicated routing service on the fabric.

The IB fabric includes multiple network switches with management Ethernet access to a management network. There is in-band physical connectivity between the switches in the fabric. In one example, there is at least one in-band route of one or more hops between each pair of switches, when the IB fabric is not degraded. Management nodes for the IB fabric include network switches and management hosts that are connected to the IB fabric.

A subnet manager can be accessed via any of its private IP addresses. The subnet manager can also be accessible via a floating IP address that is configured for the master subnet manager when the subnet manager takes on the role as a master subnet manager, and the subnet manager is unconfigured when it is explicitly released from the role. A master IP address can be defined for both the external management network as well as for the fabric based management IP network. No special master IP address needs to be defined for point-to-point IP links.

In accordance with an embodiment of the invention, each physical host can be virtualized using virtual machine based guests. There can be multiple guests existing concurrently per physical host, for example one guest per CPU core. Additionally, each physical host can have at least one dual-ported Host Channel Adapter (HCA), which can be virtualized and shared among guests, so that the fabric view of a virtualized HCA is a single dual-ported HCA just like a non-virtualized/shared HCA.

The IB fabric can be divided into a dynamic set of resource domains implemented by IB partitions. Each physical host and each gateway instance in an IB fabric can be a member of multiple partitions. Also, multiple guests on the same or different physical hosts can be members of the same or different partitions. The number of the IB partitions for an IB fabric may be limited by the P_key table size.

In accordance with an embodiment of the invention, a guest may open a set of virtual network interface cards (vNICs) on two or more gateway instances that are accessed directly from a vNIC driver in the guest. The guest can migrate between physical hosts while either retaining or having updated vNIC associates.

In accordance with an embodiment of the invention, switches can start up in any order and can dynamically select a master subnet manager according to different negotiation protocols, for example an IB specified negotiation protocol. If no partitioning policy is specified, a default partitioning enabled policy can be used. Additionally, the management node partition and the fabric based management IP subnet can be established independently of any additional policy information and independently of whether the complete fabric policy is known by the master subnet manager. In order to allow fabric level configuration policy information to be synchronized using the fabric based IP subnet, the subnet manager can start up initially using the default partition policy. When fabric level synchronization has been achieved, the partition configuration, which is current for the fabric, can be installed by the master subnet manager.

M_Key

In accordance with an embodiment of the invention, a set of subnet manager instances can cooperate to provide a highly available subnet manager service within the IB subnet using a private secure key. One example of such a private secure key is an M_Key that can be used to facilitate protection against undesired consequences of various network abnormalities in an IB fabric. In one embodiment, the M_Key is a 64 bit secret value that has the function of a password, and is known only to authorized entities in the IB fabric. When a Subnet Management Agent (SMA) associated with a port in the IB fabric is configured with an M_Key value, any in-band SMP request to change a state associated with the port has to specify the correct M_Key value.

Figure 3:
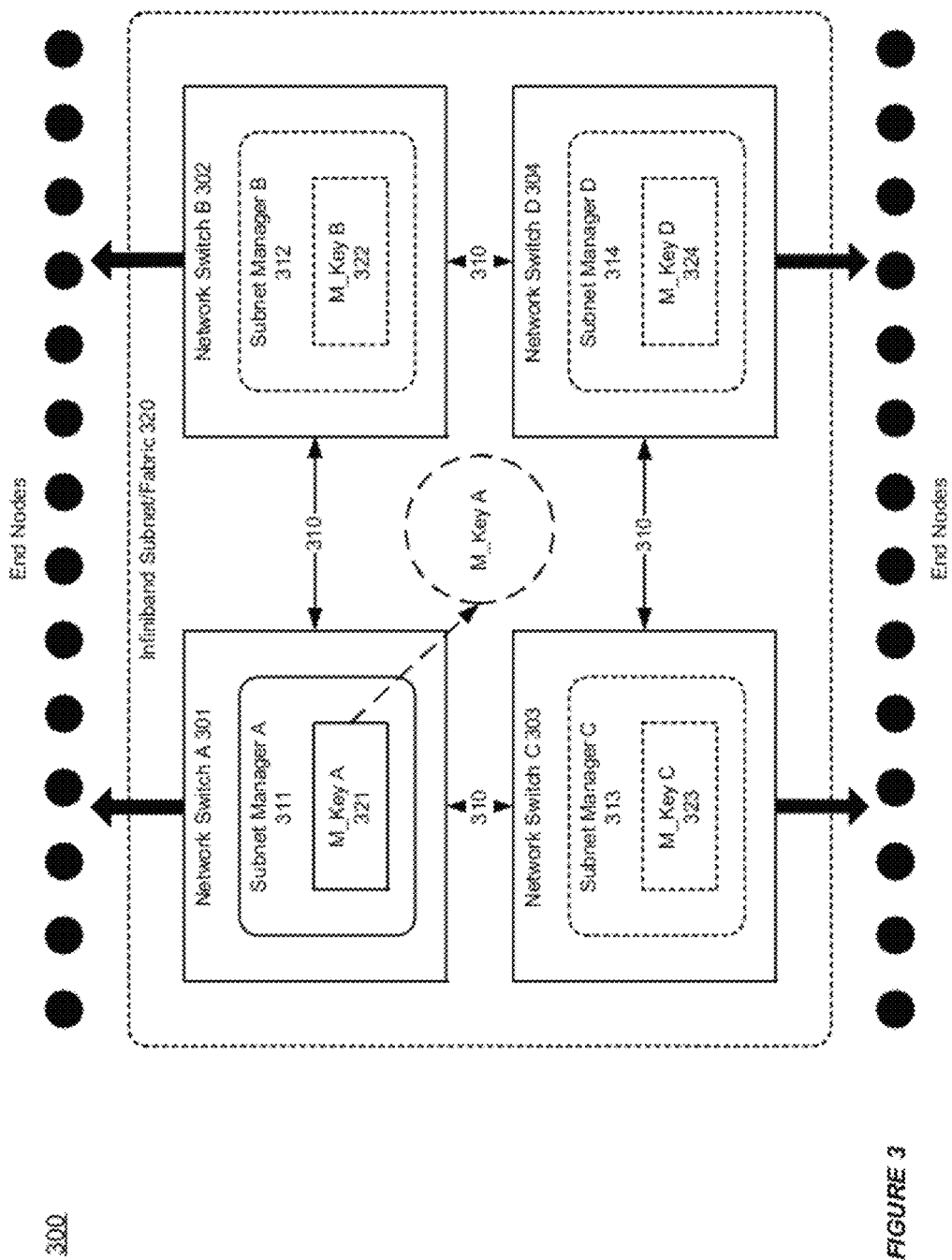
FIG. 3 shows an illustration of a middleware machine environment that uses an M_Key, in accordance with an embodiment of the invention.

FIG. 3 shows an illustration of a middleware machine environment that uses an M_Key, in accordance with an embodiment of the invention. As shown in FIG. 3, an IB subnet or fabric 320 in the middleware machine environment 300 includes a plurality of subnet managers 311-314. Each subnet manager resides on one of a plurality of network switches 301-304 and is associated with a different M_Key 321-324. The subnet managers can communicate with each other using an in-band communication protocol 310.

The subnet managers can negotiate with each other and elect a master subnet manager, which is responsible for configuring and managing the IB fabric in the middleware machine environment. In the example as shown in FIG. 3, subnet manager A 311 is elected as the master subnet manager. As a result, the M_Key A 321 that is associated with the subnet manager A is selected for configuring and managing the IB subnet. Additionally, each of the subnet managers B-D 312-314 as shown in FIG. 3 can monitor subnet the manager A and prepare to take over as the master subnet manager when it is necessary.

Figure 4:
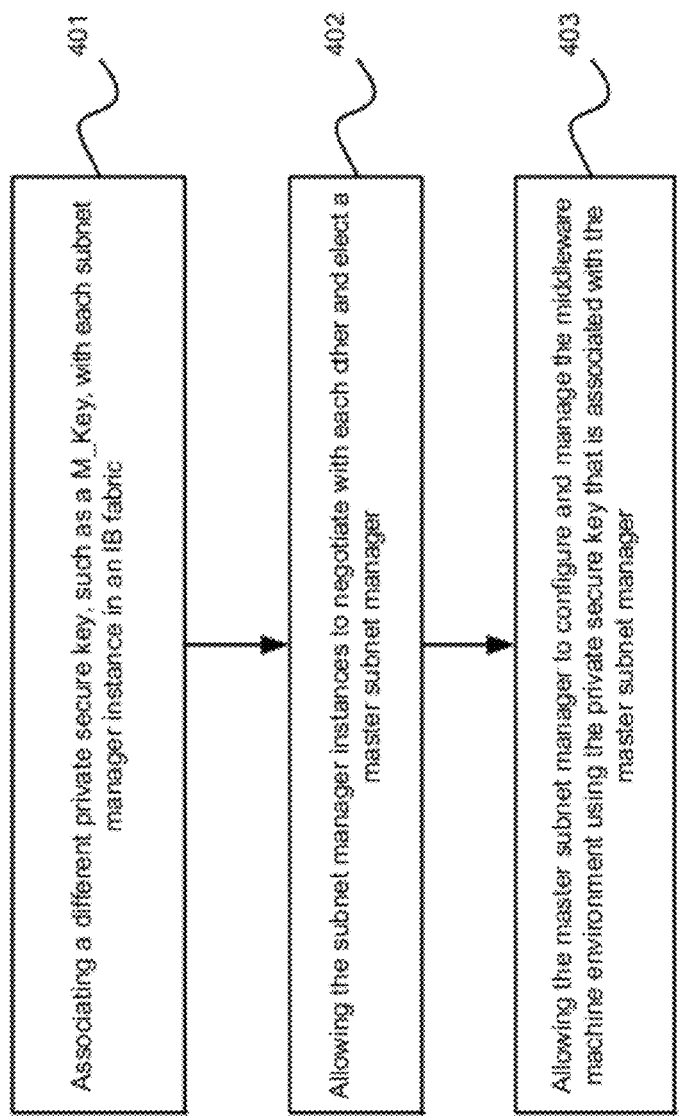
FIG. 4 illustrates an exemplary flow chart for setting up routing logic in an IB fabric using M_Key, in accordance with an embodiment of the invention.

FIG. 4 illustrates an exemplary flow chart for setting up routing logic in an IB fabric using M_Key, in accordance with an embodiment of the invention. As shown in FIG. 4, at step 401, the system can associate a different private secure key, such as an M_Key, with each subnet manager instance in the IB fabric. The subnet manager instances cooperate to provide a highly available subnet manager service within an IB subnet. Then, the subnet manager instances can negotiate with each other and elect a master subnet manager at step 402. Finally, at step 403, the master subnet manager can configure and manage the middleware machine environment using the private secure key that is associated with the master subnet manager.

Figure 5:
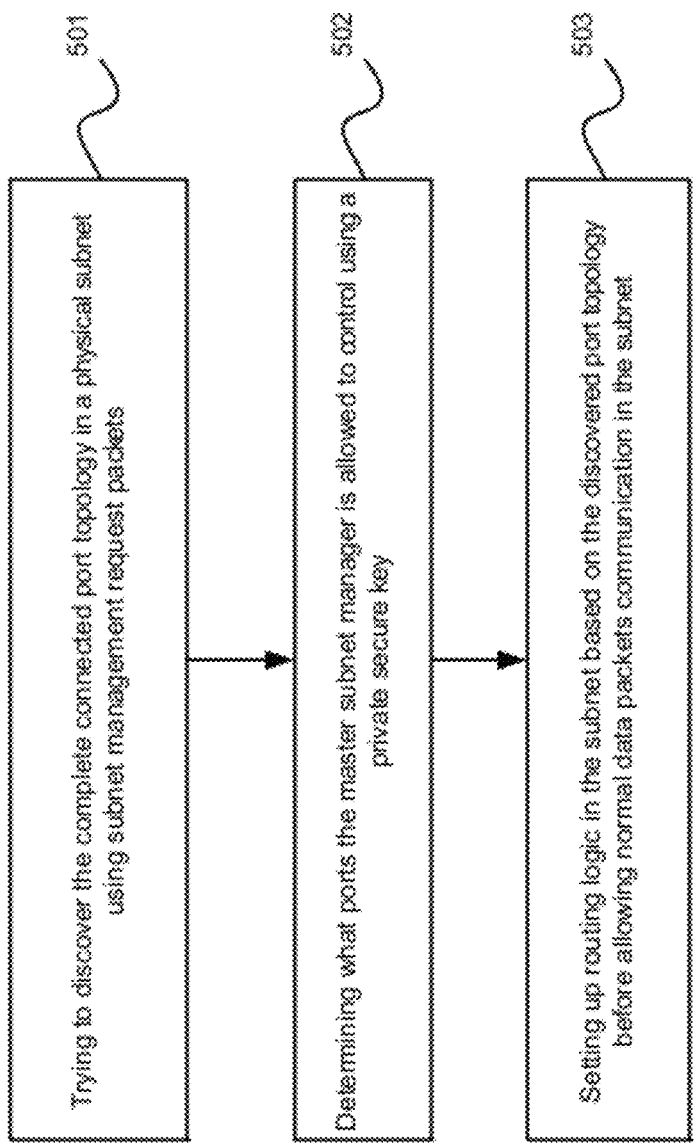
FIG. 5 illustrates an exemplary flow chart for setting up routing logic in an IB fabric using M_Key, in accordance with an embodiment of the invention.

FIG. 5 illustrates an exemplary flow chart for setting up routing logic in an IB fabric using M_Key, in accordance with an embodiment of the invention. As shown in FIG. 5, at step 501, a master subnet manager can first try to discover the complete connected port topology in a physical IB subnet using SMP request packets. Then, at step 502, the master subnet manager can determine what ports it is allowed to control using M_Keys and/or explicit node/port-list configuration information defined via out-of-band policy input. Finally, at step 503, the master subnet manager can set up routing logic in the IB fabric based on the discovered port topology before allowing normal data packets communication in the IB fabric.

Protection Against "Run-Away" Subnet Manager Instances

In accordance with one embodiment of the invention, each subnet manager instance can be associated with a particular M_Key value/range that is known to the other subnet manager instances in the same IB fabric. The set of subnet manager instances in the IB fabric can dynamically determine which M_Key in a defined range is in use depending on which subnet manager is currently the master subnet manager.

Figure 6:
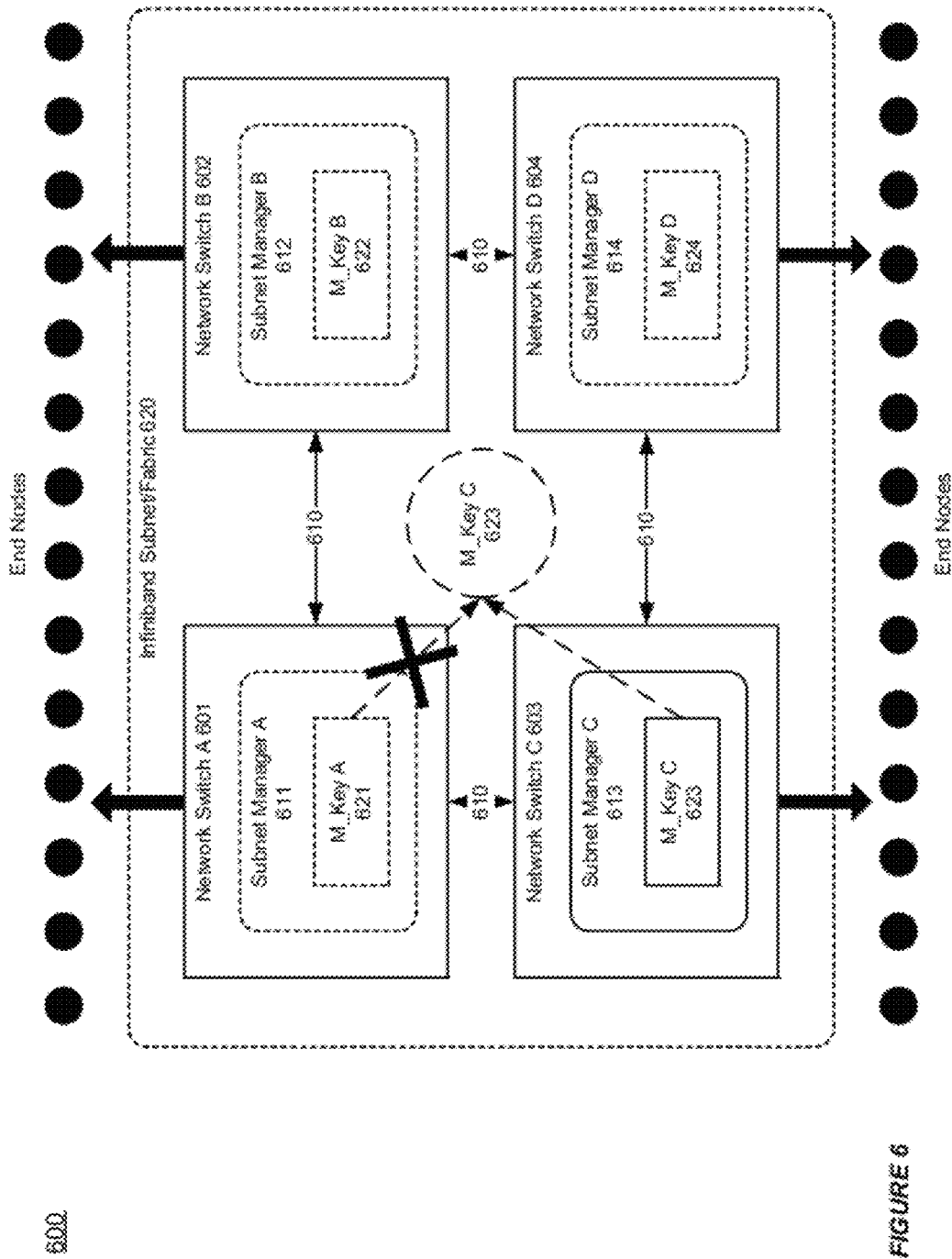
FIG. 6 shows an illustration of a middleware machine environment that supports an explicit take-over scheme, in accordance with an embodiment of the invention.

FIG. 6 shows an illustration of a middleware machine environment that supports an explicit take-over scheme, in accordance with an embodiment of the invention. As shown in FIG. 6, the subnet manager A 611 is suspended or failed, for example, the subnet manager A has been prevented from performing normal operations and handshakes with standby subnet manager instance for a period of time, and the subnet manager C 613 takes over the IB subnet 620 subsequently. Accordingly, the M_Key C 623 that is associated with the subnet manager C replaces the old M_Key, M_Key A, and is used in the IB fabric 620.

In accordance with one embodiment of the invention, an old "run-away" master subnet manager, for example the subnet manager A as shown in FIG. 6, can be interrupted and/or prevented from running for a significant period of time (e.g. due to a scheduling problem on the platform it is running on). When the subnet manager A connects back to the IB fabric, the subnet manager A can realize that a new master subnet manager has been elected for the IB subnet and a new M_Key is in use in the IB fabric. Then, the system can automatically prevent the subnet manager A from resuming normal operations as the master subnet manager, in order to avoid undesired consequence such as a "split brain" scenario. The "split brain" scenario can happen when the old master subnet manager performs state updates on the nodes and ports in the subnet in a way that conflicts with concurrent updates from the new master subnet manager.

Figure 7:
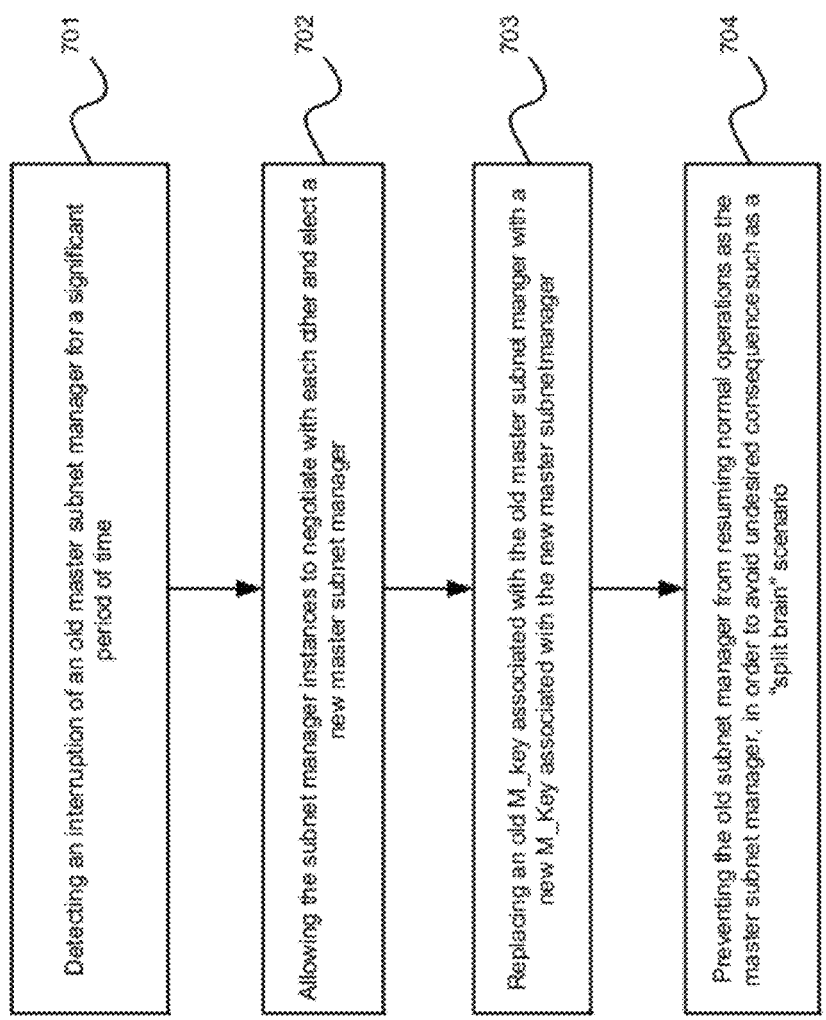
FIG. 7 illustrates an exemplary flow chart for supporting an explicit take-over scheme in a middleware machine environment, in accordance with an embodiment of the invention.

FIG. 7 illustrates an exemplary flow chart for supporting an explicit take-over scheme in a middleware machine environment, in accordance with an embodiment of the invention. As shown in FIG. 7, at step 701, the system can detect an interruption of an old master subnet manager for a significant period of time. Then, at step 702, the set of subnet manager instances can elect a new master subnet manager. The IB fabric can replace the old M_Key associated with the old master subnet manger with a new M_Key associated with the new master subnet manager at step 703. Finally, at step 704, the IB fabric can automatically prevent the old subnet manager from resuming normal operations as the master subnet manager, in order to avoid undesired consequence such as a "split brain" scenario.

Robust Fencing of Subnet Manager Instances that are not Able to Receive Updated Subnet Configuration Policies In accordance with an embodiment of the invention, new policies, such as subnet configuration policies, can be applied in an IB subnet by implementing a new set of subnet manager instances or updating an old set of subnet manager instances, without depending on the operational states or reachability of the existing subnet manager instances.

Figure 8:
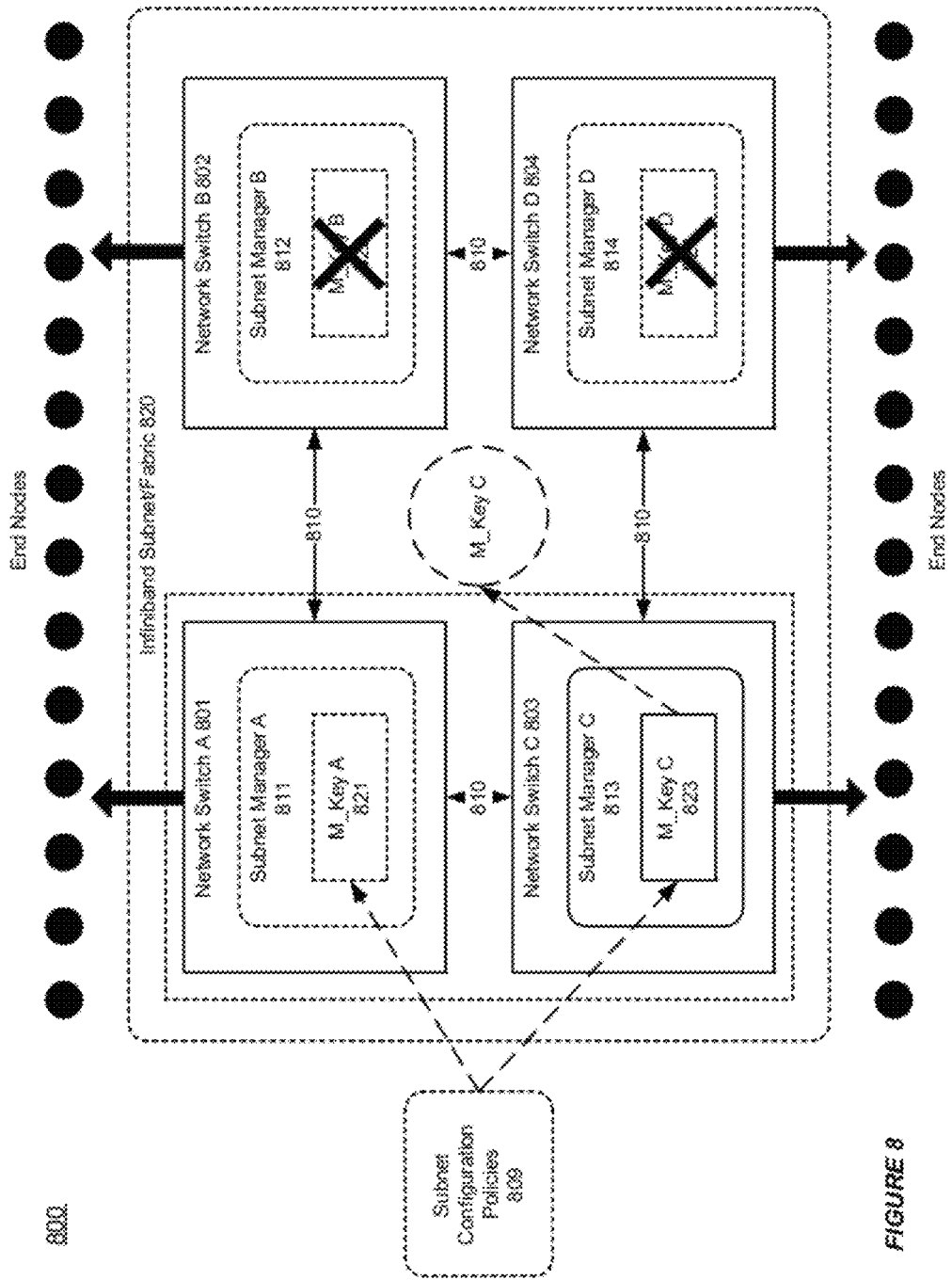
FIG. 8 shows an illustration of a middleware machine environment that supports robust fencing of subnet manager instances that are not able to receive updated subnet configuration policies, in accordance with an embodiment of the invention.

FIG. 8 shows an illustration of a middleware machine environment that supports robust fencing of subnet manager instances that are not able to receive updated subnet configuration policies, in accordance with an embodiment of the invention. As shown in FIG. 8, updated subnet configuration policies 809, can be applied in an IB subnet 820 via a subnet manager A 811 and a subnet manager C 813. The subnet manager A and the subnet manager C can have M_Key value ranges that are only recognizable among themselves.

In accordance with an embodiment of the invention, the system can ensure robust fencing of subnet manager instances that are not able to receive updated subnet configuration policies in a coordinated manner, such as in an ACID compliant manner. In the example as shown in FIG. 8, the existing subnet managers in the IB subnet, the subnet manager B 812 and the subnet manager D 814, can not recognize the M_Key values associated with the updated subnet configuration policies. Therefore, the subnet manager B and the subnet manager D are not able to receive the updated subnet configuration policies. As a result, the updated configuration policy can be applied in the IB subnet through the subnet managers A and C, leaving the subnet managers B and D unaffected by the new policies. Further, neither subnet managers B or D can change the state of the subnet based on any old and potentially stale configuration policy stored locally on the corresponding nodes.

Figure 9:
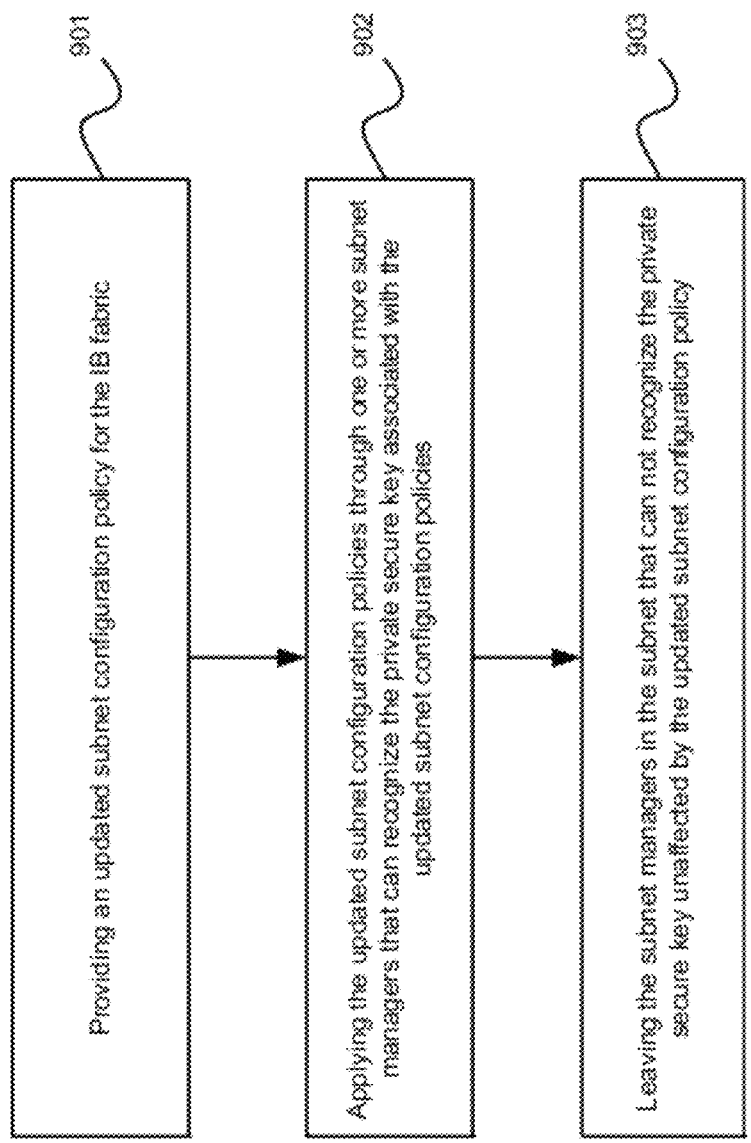
FIG. 9 illustrates an exemplary flow chart for supporting robust fencing of subnet manager instances that are not able to receive updated subnet configuration policies in a middleware machine environment, in accordance with an embodiment of the invention.

FIG. 9 illustrates an exemplary flow chart for supporting robust fencing of subnet manager instances that are not able to receive updated subnet configuration policies in a middleware machine environment, in accordance with an embodiment of the invention. As shown in FIG. 9, at step 901, a user can provide an updated subnet configuration policy for the IB fabric. The IB fabric can apply updated subnet configuration policies through one or more subnet managers that can recognize an M_Key associated with the updated subnet configuration policies at step 902. Then, at step 903, the subnet managers in the IB subnet that can not recognize the M_Key can be left unaffected by the new policies. Such subnet managers are thereby effectively excluded from the group of cooperating subnet managers in this subnet.

Guarding Against Negative Effect of Accidental Subnet Merge

Figure 10:
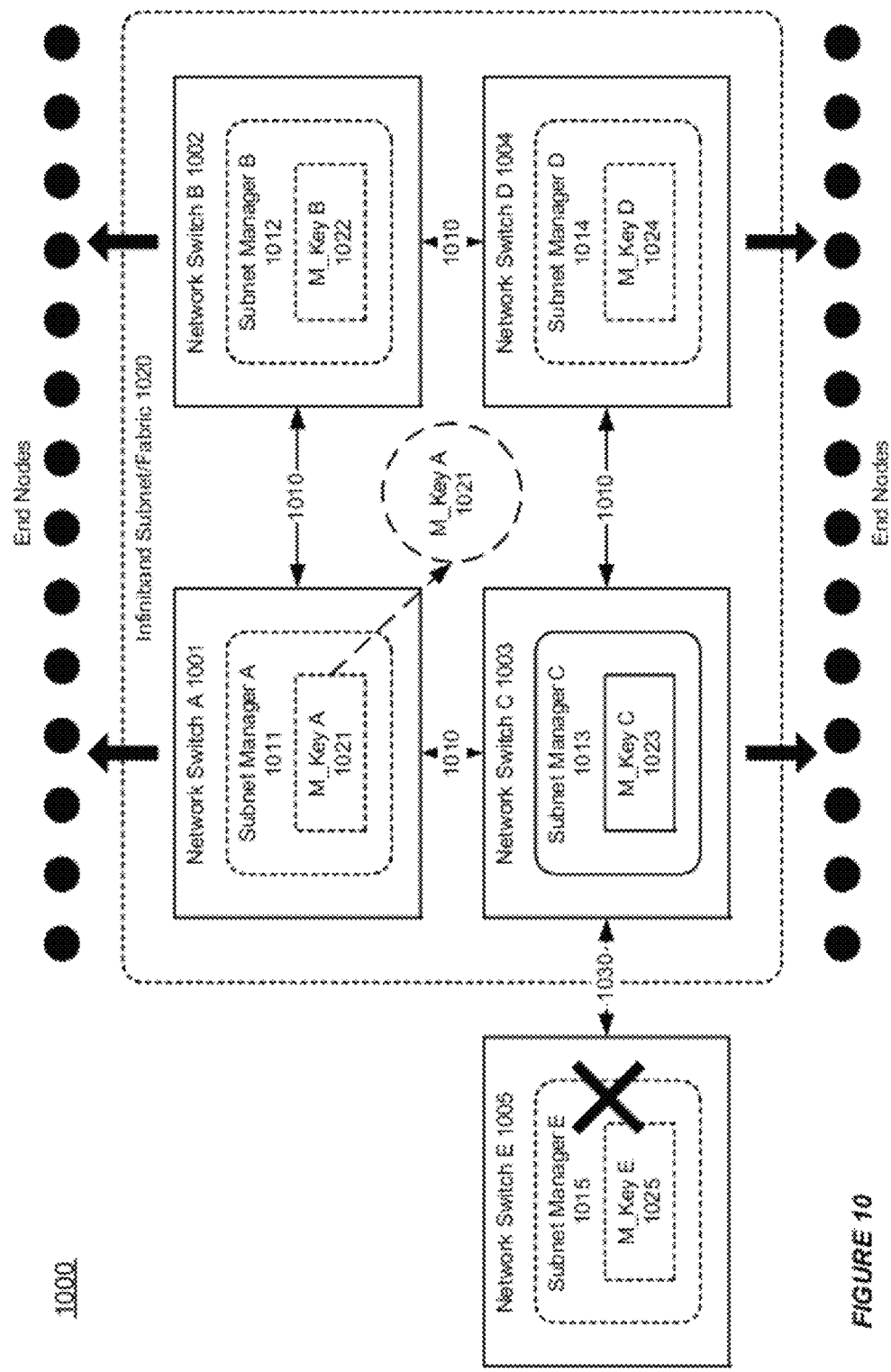
FIG. 10 shows an illustration of a middleware machine environment with an accidental subnet merge, in accordance with an embodiment of the invention.

FIG. 10 shows an illustration of a middleware machine environment with an accidental subnet merge, in accordance with an embodiment of the invention. As shown in FIG. 10, an IB subnet or fabric 1020 in the middleware machine environment 1000 manages a plurality of end nodes. The subnet manager A 1001 is the master subnet manager that configures and manages the IB subnet using an M_Key A 1021.

In accordance with an embodiment of the invention, the system can guard against potential negative effect associated with an accidental subnet merge. In the example as shown in FIG. 10, a subnet manager E 1005, which is not part of the IB fabric, is accidentally connected to the IB subnet 1020 by mistake via a network connection 1030. The subnet manager E 1015 can first try to discover port topology using M_Keys or explicit node/port-list configuration. Since the connection of the subnet manager E to the IB fabric is unintentional, the subnet manager E can not recognize the M_Key C 1021 that is used in the IB subnet 1020. Accordingly, the subnet manager E will not communicate with the ports/nodes in the IB subnet 1020, in order to prevent undesired consequence such as unauthorized access. Also, the subnet manager A may not know the M_Key value used in the other subnet that the subnet manger E is a part of. Accordingly, the subnet manager A will not try to, or be able to change any state in the other subnet. Accordingly, there can be no change of state in either IB subnet 1020 or the other IB subnet as a result of the said accidental connectivity established between the two IB subnets.

Figure 11:
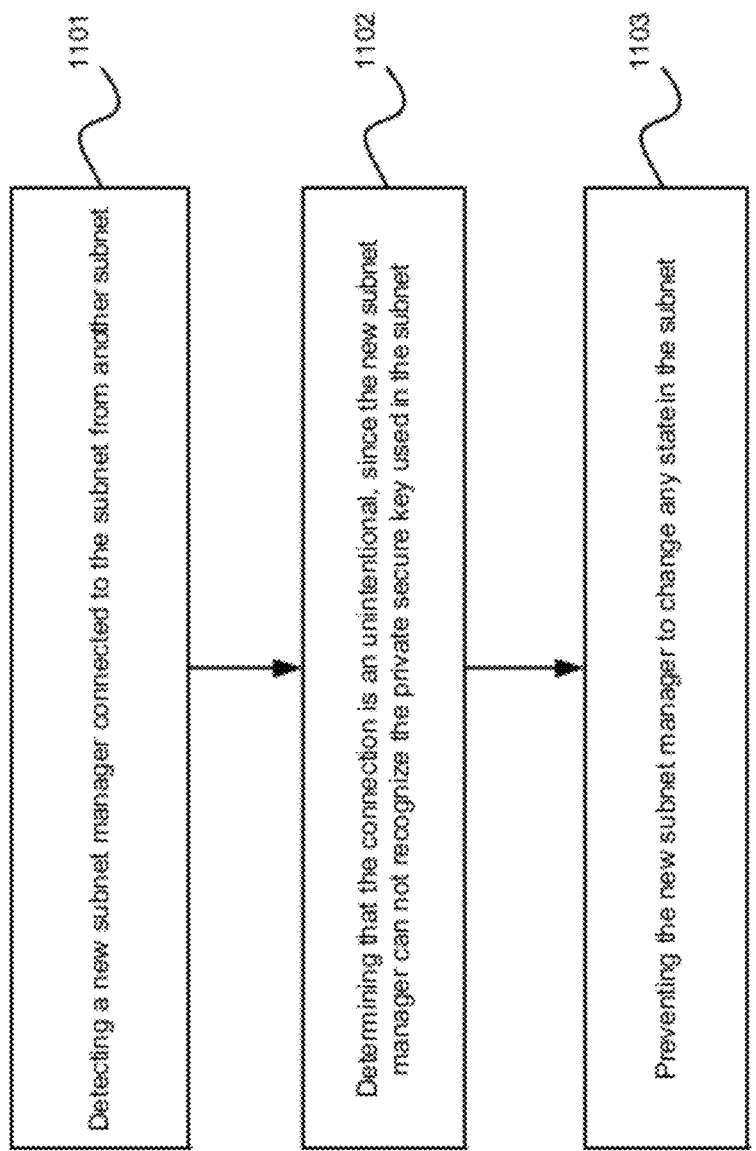
FIG. 11 illustrates an exemplary flow chart for guarding against negative effect of accidental subnet merge in a middleware machine environment, in accordance with an embodiment of the invention.

FIG. 11 illustrates an exemplary flow chart for guarding against negative effect of accidental subnet merge in a middleware machine environment, in accordance with an embodiment of the invention. As shown in FIG. 11, at step 1101, a master subnet manger in the IB subnet can detect a new subnet manager from another IB subnet. Then, at step 1102, the master subnet manager can determine that the connection is unintentional, since the new subnet manager can not recognize the M_Key used in the IB subnet. Accordingly, the IB fabric can prevent the new subnet manager from changing any state in the IB subnet at step 1103.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting a middleware machine environment, comprising:
   one or more microprocessors;
   one or more network switches, wherein each said network switch provides one or more ports that are used to connect with servers in a middleware machine environment, and wherein the one or more network switches are configured to provide a subnet;
   a set of subnet manager instances that resides on one or more nodes running on the one or more microprocessors in the middleware machine environment, wherein the set of subnet manager instances cooperate to provide a subnet manager service within the subnet, wherein each said subnet manager instance is associated with a different key value or range that is known to other subnet manager instances, and
   wherein the set of subnet manager instances can negotiate with each other and elect a master subnet manager, which is responsible for configuring and managing the middleware machine environment using the key value or range that is associated with the master subnet manager, including that
   the set of subnet manager instances determine which key value or range is currently in use; and based on that determination determine whether to elect a master subnet manager.

2. The system according to claim 1, further comprising a separate storage system that connects with the plurality of host servers through said one or more network switches.

3. The system according to claim 1, wherein: the subnet is an Infiniband (IB) subnet.

4. The system according to claim 1, further comprising: one or more gateway instances that can be accessed by a guest.

5. The system according to claim 1, wherein: the subnet manager instances can communicate with each other using an in-band communication protocol.

6. The system according to claim 1, wherein: the subnet can be divided into a dynamic set of resource domains implemented by subnet partitions.

7. The system according to claim 1, wherein: the master subnet manager can use a default partitioning policy for initialization when no partitioning policy is specified.

8. The system according to claim 1, wherein: the key value is a M_Key that is a 64 bit secret value that is known only to authorized entities in the subnet.

9. The system according to claim 8, wherein: when a subnet management agent (SMA) associated with a port in the subnet is configured with a M_Key value, an in-band request needs to specify the M_Key value in order to change a state associated with the port.

10. The system according to claim 1, wherein: the subnet is reconfigured to be associated with a different key value or range, when a different subnet manager instance is elected as the master subnet manager.

11. The system according to claim 1, wherein: each different key value or range is defined in a different range that is known to other subnet manager instances in the subnet.

12. The system according to claim 1, wherein: the set of subnet manager instances in the subnet can dynamically determine which key value or range in a defined range is in use depending on which subnet manager instance is currently the master subnet manager.

13. The system according to claim 1, wherein: an old master subnet manager is automatically prevented from resuming normal operations as a master subnet manager after a new master subnet manager is elected in order to prevent a split brain scenario.

14. The system according to claim 1, wherein: one or more updated subnet configuration policies can be applied in the subnet through one or more subnet managers that can recognize the key value or range associated with the updated subnet configuration policies, and other subnet managers in the subnet that cannot recognize the key value or range can be left unaffected by the one or more updated subnet configuration policies and be prevented from updating a state of the subnet.

15. The system according to claim 1, wherein: the master subnet manager can determine that a connection to a new node is unintentional since the master subnet manager cannot recognize the private secure key used for the node.

16. The system according to claim 15, wherein: the master subnet manager in a remote subnet containing the new node is not allowed to change a state in the subnet and the master subnet manager in the subnet is not allowed to change a state in the remote subnet.

17. A method for supporting a middleware machine environment, comprising:
   providing one or more network switches, wherein each said network switch provides one or more ports that are used to connect with servers in a middleware machine environment, and wherein the one or more network switches are configured to provide a subnet;
   associating a different key value or range with each subnet manager instance in a set of subnet manager instances, wherein each said subnet manager instance is associated with different key values or ranges that is known to other subnet manager instances and each said subnet manager instance resides on one or more nodes running on one or more microprocessors in the middleware machine environment, wherein the set of subnet manager instances cooperate to provide a subnet manager service within the subnet;
   allowing the set of subnet manager instances to negotiate with each other and elect a master subnet manager; and
   configuring and managing the middleware machine environment using the private secure key that is associated with the master subnet manager, including that
   the set of subnet manager instances determine which key value is currently in use; and, based on that determination determine whether to elect a master subnet manager.

18. A non-transitory machine readable medium having instructions stored thereon that when executed cause a system including one or more network switches, wherein each said network switch provides one or more ports that are used to connect servers in a middleware machine environment, and wherein the one or more network switches are configured to provide a subnet to perform the steps of:
   associating a different key value or range with each subnet manager instance in a set of subnet manager instances, wherein each said subnet manager instance is associated with different key values or ranges that is known to other subnet manager instances and each said subnet manager instance resides on one or more nodes running on one or more microprocessors in a middleware machine environment, wherein the set of subnet manager instances cooperate to provide a subnet manager service within the subnet;

allowing the set of subnet manager instances to negotiate with each other and elect a master subnet manager; and configuring and managing the middleware machine environment using the private secure key that is associated with the master subnet manager, including that the set of subnet manager instances determine which key value is currently in use; and, based on that determination determine whether to elect a master subnet manager.

\* \* \* \* \*

UNITED STATES PATENT AND TRADEMARK OFFICE
CERTIFICATE OF CORRECTION

PATENT NO. : 9,455,898 B2  
APPLICATION NO. : 13/235144  
DATED : September 27, 2016  
INVENTOR(S) : Johnsen et al.

Page 1 of 1

It is certified that error appears in the above-identified patent and that said Letters Patent is hereby corrected as shown below:

In Column 9, Line 39, in Claim 2, after "comprising" insert -- : --.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*